(12) United States Patent
Malvar et al.

(10) Patent No.: US 12,086,898 B2
(45) Date of Patent: Sep. 10, 2024

(54) MEDIA PROVENANCE CERTIFICATION VIA FRAGILE WATERMARKING

(71) Applicant: Microsoft Technology Licensing, LLC, Redmond, WA (US)

(72) Inventors: Henrique S. Malvar, Kirkland, WA (US); Paul England, Bellevue, WA (US); Eric J. Horvitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 16/792,989

(22) Filed: Feb. 18, 2020

(65) Prior Publication Data

US 2021/0012450 A1    Jan. 14, 2021

Related U.S. Application Data

(60) Provisional application No. 62/873,791, filed on Jul. 12, 2019.

(51) Int. Cl.
*G06T 1/00*      (2006.01)
*G10L 15/26*     (2006.01)
*G10L 19/018*    (2013.01)

(52) U.S. Cl.
CPC ............ *G06T 1/0042* (2013.01); *G10L 15/26* (2013.01); *G10L 19/018* (2013.01)

(58) Field of Classification Search
USPC ......... 382/100–309; 713/156–182, 187–194; 726/1–35
See application file for complete search history.

(56) References Cited

U.S. PATENT DOCUMENTS

| | | | |
|---|---|---|---|
| 5,905,800 A | 5/1999 | Moskowitz et al. | |
| 6,898,706 B1 * | 5/2005 | Venkatesan | H04N 21/6125 348/E7.071 |
| 7,228,425 B1 * | 6/2007 | Staring | G11B 20/00695 713/176 |

(Continued)

FOREIGN PATENT DOCUMENTS

| | | |
|---|---|---|
| CN | 101236587 A | 8/2008 |
| EA | 005605 A | 6/2003 |

(Continued)

OTHER PUBLICATIONS

Zhu, Qin, Method for Querying And Verifying Outsourced Database Based on Fragile Watermarking, Aug. 6, 2008 (Year: 2008).*
Kirovski, et al., "Spread-Spectrum Watermarking of Audio Signals", In IEEE Transactions on Signal Processing, vol. 51, Issue 4, Apr. 2003., pp. 1020-1033.
Lin, et al., "A Review of Fragile Image Watermarks", In Proceeding of ACM Multimedia Conference., vol. 1, Oct. 1999, 6 Pages.

(Continued)

*Primary Examiner* — Marcellus J Augustin

(57) ABSTRACT

Systems and methods to determine when a media is a high-fidelity reproduction of an original media from a trusted entity are disclosed. In certain aspects, systems and method for generating a fragile watermark are disclosed. The fragile watermark may be inserted into digital media in a manner such that the watermark cannot be identified if the media content is significantly altered. Media content may be subsequently analyzed to determine the presence of a fragile watermark. When the fragile watermark is present, provenance of the media content can be verified and an indication of provenance is provided to the user.

19 Claims, 13 Drawing Sheets

(56) References Cited

U.S. PATENT DOCUMENTS

| | | | | |
|---|---|---|---|---|
| 7,603,720 | B2* | 10/2009 | Rockwood | H04L 9/3247 713/176 |
| 7,730,037 | B2* | 6/2010 | Jajodia | G06F 16/24553 713/176 |
| 7,966,662 | B2* | 6/2011 | Rose | H04L 9/321 713/181 |
| 8,538,011 | B2* | 9/2013 | Moskowitz | H04L 9/3231 380/231 |
| 8,838,978 | B2* | 9/2014 | Winograd | H04L 63/102 713/176 |
| 9,965,600 | B2* | 5/2018 | Curzi | H04L 63/08 |
| 2001/0054144 | A1* | 12/2001 | Epstein | G11B 20/00086 713/193 |
| 2003/0204729 | A1 | 10/2003 | Rockwood | |
| 2005/0081042 | A1 | 4/2005 | Venkatesan et al. | |
| 2010/0052852 | A1* | 3/2010 | Mohanty | B42D 25/333 380/243 |
| 2012/0106780 | A1 | 5/2012 | Ellis | |
| 2013/0145174 | A1* | 6/2013 | Hallum | G06Q 10/10 713/189 |
| 2017/0053105 | A1 | 2/2017 | Curzi | |
| 2017/0286239 | A1 | 10/2017 | Baptist | |
| 2018/0253567 | A1* | 9/2018 | Gonzalez-Banos | G06F 16/70 |

FOREIGN PATENT DOCUMENTS

| | | |
|---|---|---|
| JP | 2002112210 A | 4/2002 |
| JP | 2003179741 A | 6/2003 |
| JP | 2005039686 A | 2/2005 |
| JP | 2006325219 A | 11/2006 |
| KR | 20040054688 A | 6/2004 |
| RU | 2298295 C2 | 4/2007 |
| WO | 2008013655 A2 | 1/2008 |
| WO | 2010096192 A1 | 8/2010 |
| WO | 2010096292 A1 | 8/2010 |

OTHER PUBLICATIONS

Monti, et al., "Fake News Detection on Social Media using Geometric Deep Learning", In Journal of the Computing Research Repository, Feb. 2019, 15 Pages.

"International Search Report and Written Opinion Issued in PCT Application No. PCT/US20/036716", Mailed Date: Oct. 6, 2020, 13 Pages.

Sabir, et al., "Recurrent Convolutional Strategies for Face Manipulation Detection in Videos", In Journal of the Computing Research Repository, May 2019, 8 Pages.

"Office Action Issued in European Patent Application No. 20750487.9", Mailed Date: Jun. 23, 2023, 6 Pages.

"Notice of Allowance Issued in South African Patent Application No. 2021/09972", Mailed Date: Dec. 13, 2022, 1 Page.

Office Action received for Indonesian Application No. P00202200250, mailed on Dec. 15, 2023, 8 pages (English Translation Provided).

Office Action received for Israel Application No. 289636, mailed on Jan. 14, 2024, 4 pages.

Office Action Received for Russian Application No. 2022103422, mailed on Oct. 26, 2023, 15 pages.

Office Action Received for Indian Application No. 202217000881, mailed on Apr. 8, 2024, 08 pages.

Office Action Received for Russian Application No. 2022103422, mailed on Mar. 19, 2024, 10 pages. (English Translation Provided).

Notice of Reasons for Refusal Received for Japanese Application No. 20210573230, mailed on May 14, 2024, 11 pages (English Translation Provided).

Office Action Received for Korean Application No. 10-2022-7001206, mailed on May 12, 2024, 14 pages (English Translation Provided).

Communication pursuant to Article 94(3) EPC Received for European Application No. 20750487.9, mailed on Jun. 26, 2024, 05 pages.

Notice of Allowance received for Indonesian Application No. P00202200250, mailed on May 20, 2024, 04 pages (English Translation Provided).

* cited by examiner

MEDIA PROVENANCE CERTIFICATION VIA FRAGILE WATERMARKING

PRIORITY CLAIM

This application claims priority to U.S. Provisional Application No. 62/873,791, titled "Media Provenance Certification via Fragile Watermarking," filed on Jul. 12, 2019, the entire disclosure of which is hereby incorporated by reference in its entirety.

BACKGROUND

The tools for generating manipulative videos that can be used in new forms of propaganda and disinformation are becoming more commonplace. These tools make it easy for individuals, government actors, and non-government entities to synthesize and distribute fake or modified renderings of events. As a result, a number of challenges exist when attempting to verify the veracity of news reports, the falsity of which pose a threat to the rule of law and democracy around the world.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and methods that may be employed to determine when a media is a high-fidelity reproduction of an original media from a trusted entity. In certain aspects, systems and method for generating a fragile watermark are disclosed. The fragile watermark may be inserted into digital media in a manner such that the watermark cannot be identified if the media content is significantly altered. However, the fragile watermark will remain detectable if minor modifications to the media are made. In this manner, originally created media can be distributed such that if the media is significantly altered, a user can be informed that the media does represent the original media produced by a trusted source.

In further aspects, systems and methods are provided to determine whether requested media content is from a trusted media source. In such aspects, when a user desires to access a media file, a unique identifier for the media file may be generated and sent to a provenance service. If the specific media was not previously analyzed by the provenance service, the media itself may be transmitted to the provenance service for a provenance analysis. If the provenance service is able to identify a fragile watermark associated with a trusted source, the provenance of the media as ascertained and provided to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
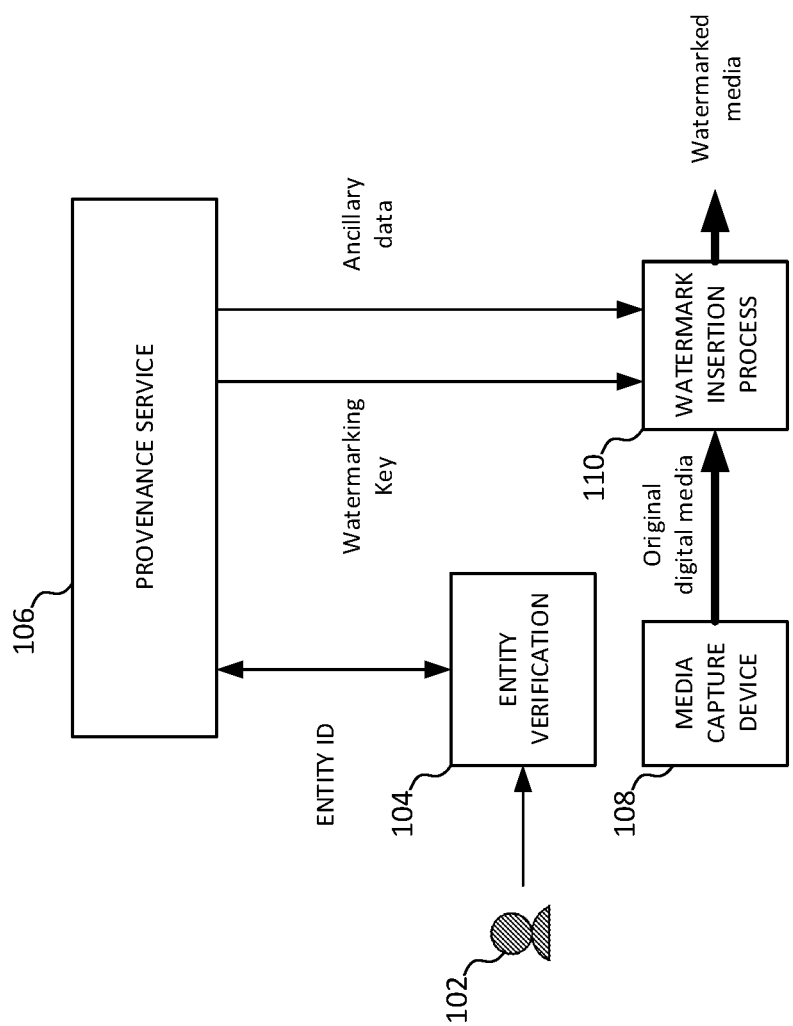
FIG. 1 is an exemplary high-level architecture 100 for the creation of media for provenance verification.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, a software implementation, or an implementation combining software and hardware aspects. The following detailed description is therefore not to be taken in a limiting sense, and the scope of the present disclosure is defined by the appended claims and their equivalents.

Aspect of the present disclosure relate to ascertaining the provenance of media using fragile watermarks. Recently, there has been an increase in the amount of fake media distributed via Internet. As discussed herein, fake media relates to media that has been fabricated to look real, or doctored original media that has been modified to present the media in a way that is misleading. A number of factors have resulted in the rise in distribution of fake media. Artificial intelligence (AI) technology for media creation has evolved to a point where synthetic video and audio can be produced with convincing fidelity. This issue is especially true for synthetic voices, which can be indistinguishable from real voices, even to forensic audio experts. On the other hand, tools to identify fake, synthetic, or doctored media have not evolved at the same pace as tools for creation of misleading or inaccurate media.

The availability of tools for generating manipulative media (e.g., videos, audio, pictures) further results in new forms of propaganda and disinformation being distributed through traditional media channels and, in particular, social media networks. Such tools make it easy for individuals, government actors, and non-government entities to synthesize and distribute fake or modified renderings of events. The misuse of fake media results in significant negative impact on individuals and on society, for example, by damaging reputations, influencing elections, destabilizing government and/or organizations, etc.

Detection of fake media is a technically difficult problem to solve. Compared to the rapid advances of AI and machine learning technologies directed towards the creation of fake media, in either text or multimedia forms (e.g., audio, video, pictures), attempts to develop systems for automatic detection of fake media have only been moderately successful. Indeed, state-of-the-art tools for determining whether a media file is fake have yet to provide a reliable counter to the tools used for the creation of fake media. Additionally, and particularly with respect to social media networks, media channels have not shown a strong interest in actually identifying and policing fake media as the distribution of such media results in higher revenues for the media channel. In light of these considerations, aspects of the present disclosure relate to certifying the provenance, or truthfulness, of accurate media rather than identifying fake media.

Aspects of the present disclosure relate to systems and methods that may be employed to determine when a media is a high-fidelity reproduction of an original media from a trusted entity. As used herein, a trusted entity may be an individual, an organization (e.g., a news agency, cable and/or local news organizations, newspapers, etc.), or a trusted device (e.g., a camera or recorder that captured the original media). Asserting provenance using the systems and methods disclosed herein can have a significant impact with respect to curtailing the distribution and/or impact of fake media. For example, when users browse a websites, if a "seal of authenticity" is overlaid by the browser on specific pieces of media (pictures, video clips, audio clips, and voice recordings), the users can feel more confident that the media they are viewing is accurate and has not been modified. On a larger scale, society may start trusting to only media with such certification seals, which could significantly reduce the negative societal impact of fake media.

However, certification of provenance of a particular piece of media is more difficult than existing techniques used to provide assurances to users accessing content over the Internet, such as the user of website certifications. Media files, for example, JPEG pictures, MPEG videos, MP3 audio, etc., contain metadata that, among other functions, may be used to identify the source of the media file. However, certification of provenance of a media file cannot rely on metadata as metadata is easily modifiable. As such, there is no way to ensure that metadata is preserved through the production path from media creation using a device (e.g., a camera, a recorder, etc.) to the media being rendered using a web browser or other application.

The process of determining the provenance of media is further complicated by the fact that is not feasible to confirm that a particular piece of media is identical to the original form of the source material. Media files will invariably be edited before a final version of the media will be posted on a website. Regardless, if the editing is "light" (e.g., some cropping, recompression and resampling at a good fidelity to reduce file size, etc.) such that the final picture or video looks the same as the original to the human eye, the media file should be certified an accurate representation of the source material. As such, the characteristics of media files and requirements for certifying media as accurate despite changes to the media file itself precludes the direct use of metadata fields or any form of binary file hashing in order to certify provenance of a particular piece of media.

Aspects of the present disclosure overcome the challenges noted above through the use of fragile watermarks. A variety of different techniques are available to generate a fragile watermark. One of skill in the art will appreciate that any such techniques may be employed with the systems and methods disclosed herein as long as the fragile watermark provides the following characteristics. First, the technique for producing the fragile watermark makes it possible to verify the presence of the fragile watermark by a detector operable to check for the presence of the fragile watermark and/or recover a key associated with the fragile watermark. Second, attackers should not be able to generate a valid fragile watermark, as they will not have access to the keys and/or devices that are used to generate the fragile watermark. Finally, the parameters that control the fragile watermark signal characteristics can be set such that any significant editing of the media destroys the watermark. Mild editing such as cropping, recompression or resampling at high fidelity, should preserve the fragile watermark. As such, aspects disclosed herein make use of fragile watermarks as media data typically goes through several levels of editing during production. As long as the edits are all mild, that is, they do not significantly change the media content, the fragile watermark will be preserved. As such, aspects disclosed herein allow for a distribution network in which the editing entities do not need to be certified as a trusted source. Rather, just the original source of the media file needs to be certified as trusted to determine provenance of any particular media file.

An exemplary fragile watermarking process for an audio signal is provided as an example. A fragile watermark can be inserted into the audio data by adding a low-level, noise-like signal, which appears random but is in fact controlled by a cryptographic key. Using techniques such as spread-spectrum watermarking, the resulting watermarked audio is indistinguishable from the original to a human ear. The presence of the watermark can be verified by a detector that checks for the presence of the fragile watermark. If the audio signal is mildly edited, the detector should be able to verify the presence of the fragile watermark and, as such, provide an indication that the audio file is an accurate representation of the source material. However, if the detector is unable to verify the presence of the fragile watermark, an indication that the audio file cannot be certified as an accurate representation of the original audio can be generated. Similar concepts can be applied to other media kinds, such as pictures and video.

FIG. 1 is an exemplary high-level architecture 100 for the creation of media for provenance verification. A media capture device 102 is employed to capture the original source media. Exemplary capture devices include cameras, audio recorders, smartphones, and the like. One of skill in the art will appreciate that aspects of the present disclosure may be practiced with any type of device used to capture or create original content. In certain aspects, the media capture device 102 may be associated with an entity 103. Entity 103 may be an individual, an organization, or, in some examples, the media capture device itself. Entity 103 may be a trusted entity. That is, entity 103 has been established by the provenance service 106 as being a trusted source of legitimate media. In examples, entity 103 may be an individual, such as a reporter, an organization, such as a newsroom, or a trusted device, such as a secure camera. The trusted entity 103 performs an entity verification process 104 in order to authenticate entity 103 with provenance service 106. The entity verification process 104 verifies that entity 103 is a known entity and, in response, provides an entity identifier to provenance service 106. The entity verification process 104 may authenticate entity 103 using login/password interface, biometrics, or any other type of processes used to authenticate an entity known to the art. In examples, the entity verification process 104 may be performed by a trusted third party server or by the provenance service 106 itself.

Provenance service 106 is operable to generate and detect fragile watermarks associated with media. In examples, provenance service 106 may be executed by a server, a distributed network (e.g., a cloud service network), or a local computing device. Provenance service 106 is operable to receive an entity identifier associated with entity 103 and, in response, provide a key associated with the entity 103. In examples, a trusted entity may have one or more associated keys. An associated key can be used generate a fragile watermark for a trusted entity. Provenance service 106 identifies the one or more keys associated with an entity based upon the received entity identifier.

In one example, provenance service 106 is operable to provide one or more keys to the watermark insertion process 110. In one example, the watermark insertion process 110 may be performed by provenance service 106. However, in other aspects, the watermark insertion process 110 may be performed by a device associated with the entity 103. Allowing the device associated with the entity to perform the watermark insertion process 110 allows for quicker processing and less bandwidth consumption as the media content does not have to be provided to provenance service 106. In further examples, provenance service 106 may provide ancillary data in addition to the watermarking key. In examples, the ancillary data may be data related to an entity 103, a device associated with the entity, or to the media content. For example, the ancillary data may identify a specific entity such as the requesting entity's location or department (e.g., the New York Times London bureau). In aspects, the ancillary data may identify information about a device used to capture the original content, such as an identifier for the device, the device location, etc. In yet further examples, the ancillary data may be about the media content itself, such as a transcript, a description of the content, etc. In still further examples, ancillary data can include, among other information, a GUID for the media, information about the entity, metadata on the media characteristics, etc.

Watermark insertion process 110 generates a fragile watermark for content received by the media capture device 102. In examples, watermark insertion process may be performed by the media capture device 102 or by another device. Fragile watermark generation may be performed using one or more keys. The one or more keys used to generate a fragile watermark for content may not be secured from fake media peddlers or attackers in general. Otherwise the fake media peddlers or attackers could use the keys to watermark fake content. In aspects, key generation is associated to with a specific entity such that there is a strong tie between entity identity and the one or more watermarking keys. Watermark insertion process 110 generates a fragile watermark for the media using the key received from the provenance service 106. In further examples, ancillary data received from the provenance service may also be embedded in the media by the watermark insertion process in a manner that a watermark detector is able to retrieve the embedded ancillary data.

Figure 2:
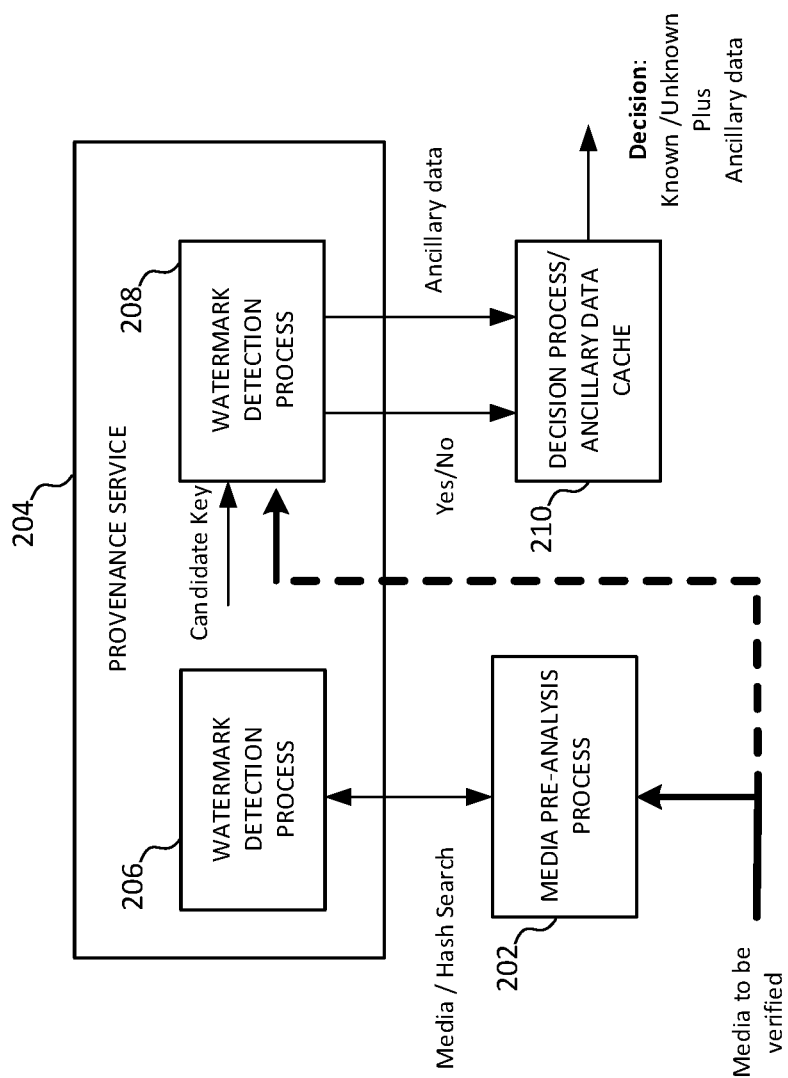
FIG. 2 is an exemplary high-level architecture 200 for provenance verification of existing media.

FIG. 2 is an exemplary high-level architecture 200 for provenance verification of existing media. In some scenarios, such as with web browsing, many users will access the same content on the same website, so their browsers will receive the same media files associated with the media. This provides for efficiencies which allows provenance service to determine whether the provenance is known for a specific media file without having to process the media file every time a user accesses the media file. Under such circumstances, the provenance service 204 may identify media content that has already been processed and provide the results of the processing to a requestor without having to process the media again. For example, the provenance service 204 may create a cache of unique identifiers for media content that was previously process by the provenance service 204 along with the results of the processing (e.g., provenance known, provenance unknown, an indication of related ancillary data, etc.). For example, a table of checksums for media files previously processed by the provenance service may be maintained to efficiently identify previously processed media files.

When a media file is received for verification, in certain aspects, the first step is to process the media using a pre-analysis process 202 to determine if the provenance service 204 previously verified the media. Pre-analysis process 202 may be performed on a client device, such as by a web browser or media player, requesting a provenance determination for a media file. Pre-analysis processing may include processing the media file to generate an identifier for the media. The processing performed during pre-analysis process 202 may be the same process used by the provenance service 204 to generate a unique identifier for a media content file. For example, pre-analysis process 202 may comprise generating a checksum, a hash, or other type of unique identifier based upon the media to be verified. The media identifier generated by the pre-analysis process 202 is provided to the provenance service 204. The provenance service 204 checks the watermark detection cache 206 to see if the media associated with the media identifier was previously processed by the provenance service 204. If the media was previously processed by the provenance service 204, the results of the prior processing is returned to a requesting device along with any related ancillary data. Otherwise, provenance service returns an indication to the requesting device that the media file was not previously processed.

If the media file was not previously processed, the media to be verified is provided to the provenance service 204. As previously discussed, provenance service 204 may be executed by a remote server or on a local computing device. In certain aspects, provenance service 204 may execute as a cloud service on a distributed network to ensure it is not susceptible to attacks on an individual device. Upon receiving the media, provenance service 204 may execute a watermark detection process 208 to determine whether the media includes a watermark. As previously noted, aspects of the present disclosure provide for the insertion of fragile watermarks into media. That is, a heavy editing process will destroy the fragile watermark. As such, detection of a fragile watermark by provenance service 204 indicates that the media is an accurate representation of media that was generated by a trusted source or entity. The watermark detection process 208 may also be operable to identify any embedded ancillary data in the media file.

As noted above, provenance service 204 may generate a unique identifier for the media once it has been processed (e.g., a checksum or hash of the media). The identifier, along with results from the watermark detection process (e.g., fragile watermark detected, not detected, ancillary data found, etc.) may be stored in watermark detection cache 206. The provenance service is further operable to provide the results of the watermark detection process 208 to a requesting device. The requesting device may, in turn, perform a decision process based upon the result returned by the provenance service to determine an action to be performed. Exemplary actions include notifying a user that the media is from known/unknown entity, providing an indicator that informs the user whether the source of the media is known or unknown, processing and/or providing the ancillary data, etc.

Figure 3:
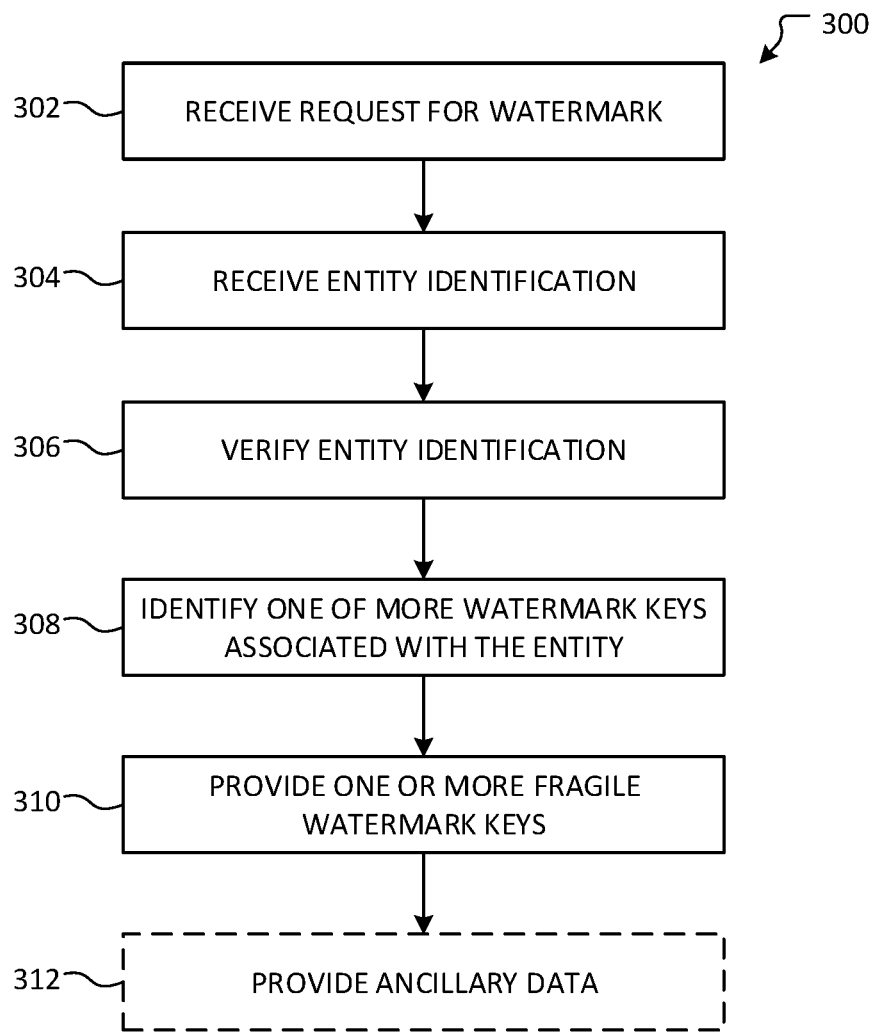
FIG. 3 is an exemplary method 300 for providing a fragile watermark key to a requesting device.

FIG. 3 is an exemplary method 300 for providing a fragile watermark key to a requesting device. In one example, the method 300 may be performed by a provenance service, such as provenance service 106 of FIG. 1. Flow begins at operation 302 where a request to generate a fragile watermark for a media file is received. In examples, the request may be received from a user device, such as a device that captured the media content, a device editing the media content, etc. At operation 304, an entity identification associated with the request is received. One of skill in the art will appreciate that the entity identification may be received along with the request to generate a fragile watermark, or in a separate communication. The entity identification may identify a person, an organization, a device, or any other known, trusted source associated with the media.

At operation 306, the received entity identification is verified to ensure that the entity is actually who the entity purports to be. One of skill in the art will appreciate that any type of identity verification may be performed at operation 306. Furthermore, a determination may be made as to the device which transmitted the request for the provenance service is associated with the entity indicated by the received entity identification information. In other examples, the entity identification may be received from a trusted source, such as a trusted third party, which may independently perform entity verification. Under said circumstances, it may not be necessary to verify the entity at operation 306.

Flow continues to operation 308 once the identity has been verified (if necessary). At operation 308 one or more keys used to generate the fragile watermark are identified. As discussed above, the fragile watermark keys are associated with the requesting entity, e.g., the requesting individual or organization. Among other benefits, this allows for the creation of a unique fragile watermark for each trusted entity registered with the system performing the method 300. Furthermore, more than one fragile watermark key may be associated with an entity. As such, different entity keys may be used for different purposes. For example, an entity may have different keys associated with different projects, departments, locations, devices, etc. In such circumstances, additional information received along with the request may be used along with the received entity identity to select the appropriate fragile watermark key(s). At operation 310, the one or more selected fragile watermark keys are provided to the requesting device. The provided fragile watermark keys may then be used by the requesting device to generate a fragile watermark for the media. In certain aspects, if available, ancillary data may also be provided at operation 312. Any provided ancillary data may be embedded in the fragile watermark or in the media file itself.

Figure 4:
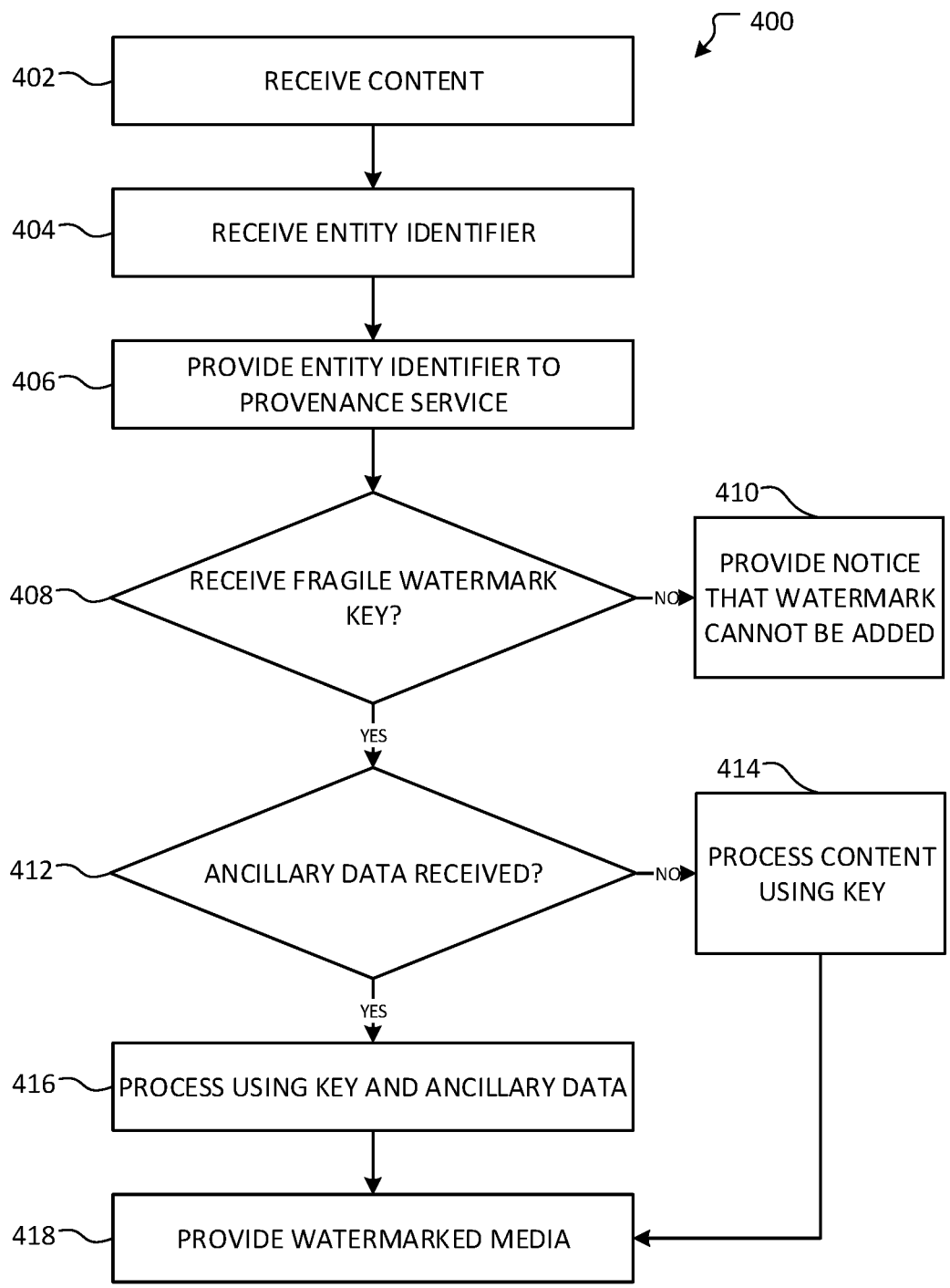
FIG. 4 is an exemplary method 400 for generating a fragile watermark on media.

FIG. 4 is an exemplary method 400 for generating a fragile watermark for a media content or a media file. Flow begins at operation 402 where the media content or file is received. The method 400 may be performed by a device that is creating or editing media for distribution. For example, the method 400 may be used by a device that captured the media (e.g., a camera, a smartphone, an audio recorder) or by a device used to edit the original captured media. The type of media content received at operation 402 may be any type of digital media including, but not limited to, pictures, video, audio, electronic documents, etc. One of skill in the art will appreciate that the aspects disclosed herein may be practiced with any type of content received regardless of the content's type or format.

At operation 404, an entity identifier is received. As noted above, aspects of the present disclosure provide for associating the content with any type of entity, such as an individual, an organization, and/or a device. This allows provenance to be associated with a content creator, a specific device, or both. At operation 406, the entity identifier is provided to a provenance server along with a request for a fragile watermark key. In some examples, the request for the fragile watermark key may include additional information about the entity, about the media itself, about devices used to capture the media, etc. This additional information may be part of the ancillary information discussed previously. In certain aspects, the entity identifier may be provided along with additional verification information such as a password, biometric information, etc., used to verify that the requestor is actually the entity she is purporting to be.

In alternate aspects, the request for the fragile watermark key and the entity identifier may be provided in separate messages. In still further aspects, the request for the watermark and the entity identifier may be provided to different parties. For example, the entity identifier may be provided to a trusted third party service to verify the entity's identity. The verification may then be provided by the trusted third party to the provenance service.

In response to sending the request at operation 406, flow continues to decision operation 408. At decision operation 408, a determination is made as to whether or not a fragile watermark key was received in response to sending the request at operation 406. In some instances, a fragile watermarking key may not be received, for example, if the key does not exist, the entity is not registered or cannot be properly validated, due to a loss of network connection, etc. If the key is not received, flow branches NO to operation 410 where a notification is provided that a fragile watermark cannot be added to the media. The notification may include additional information to the user identifying steps needed to be performed by the user in order to receive a fragile water mark key from the provenance service. Such operations may include creating a trusted account and registering with the provenance service, providing additional verification data, and the like. As no key was provided to create the fragile watermark, the method 400 may terminate at operation 410.

Returning to operation 408, if a fragile watermark key is received then flow branches YES to operation 412. At operation 412, a determination is made as to whether any additional ancillary data was received along with the fragile watermark key. As noted above, ancillary data may be data associated with the entity, a device, the media, the provenance service, etc. In some examples, the ancillary data may be generated by the provenance service and received at the requesting device. In other aspects, not shown, the ancillary data may be generated by the requesting device performing the method 400. In no ancillary data is provided, flow branches NO to operation 414. At operation 414, the media content or file is processed using the received fragile watermark key to generate a fragile watermark for the content or file. The different processed may be used to generate the fragile watermark depending on the type of key, the type of content, etc. One of skill in the art will appreciate that any type of process operable to generate a fragile watermark may be employed at operation 414 without departing from the scope of this disclosure.

Flow then continues to operation 418 where the fragile watermarked media is provided. Providing the fragile watermarked media may comprise storing the fragile watermarked media on a device, sending the fragile watermarked media to a different device, posting the fragile watermarked media on a website or social network, sending the fragile watermarked media to a broadcast service, etc.

Returning to operation 412, if ancillary data is present, flow branches YES to operation 416. At operation 416, the media content is processed using both the fragile watermark key and the ancillary data. As discussed above, any type of process may be employed to generate a fragile watermark for the content using the fragile watermarking key so long as the requirements previously set forth are met. Processing the media content with the ancillary data may include embedding the ancillary data in the fragile watermark or otherwise embedding or associating the ancillary data with the media content. Flow then continues to operation 418 where the fragile watermarked media is provided along with the ancillary data.

Figure 5:
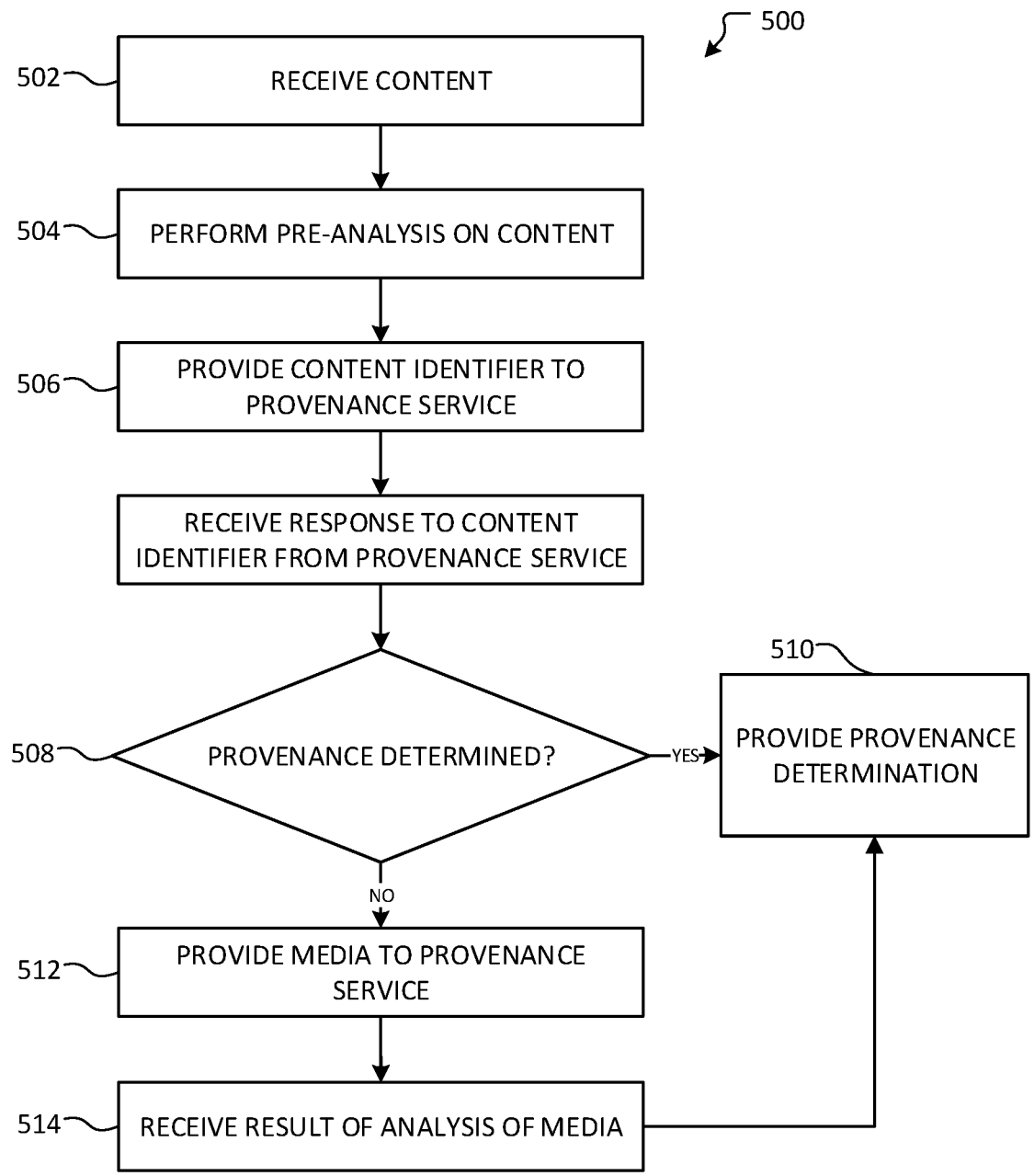
FIG. 5 is an exemplary 500 for determining the provenance of a media file accessed by a device.

FIG. 5 is an exemplary method 500 for determining the provenance of a media file accessed by a device. The method begins at operation 502 where the media to be verified is received. The media may be received via a web browser accessing the media stored on a remote computer, via a media player, via a streaming service, via email, or by any other means of receiving media content. Once the content is received, flow continues to operation 504 where the content is pre-analyzed. Pre-analysis of the content may include generating a unique identifier based upon the content. For example, a hash function may be applied to the media in order to generate a hash value that can identify the media. The content identifier generated at operation 504 is provided to a provenance service at operation 506. As previously discussed, multiple users may access the same media file. In such instances, it may be unnecessary to send the media file to the provenance service for analysis if prior analysis has already been performed. Generation and sending of the content identifier may result in a fast and efficient determination regarding the provenance of a media content or media file by leveraging past analysis performed by the provenance service. Further, sending a content identifier requires much less transmission bandwidth than sending the actual media content or file itself for analysis.

At decision operation 506, a check is performed to determine whether provenance of the media file can be determined. In one aspect, the determination may be based upon the message received from the provenance service in response to providing the content identifier. For example, if provenance is known or unknown based upon prior analysis by the provenance server, an indication of the provenance determination may be received. Otherwise, a request for the media content may be received. If provenance is determined, flow branches YES to operation 510 and the provenance determination is provided to a user. In one aspect, providing the provenance determination may include generating or displaying (or causing display of) a message to the user indicating whether the provenance of the media is known or unknown. In one example, a graphical representation may be used to indication the provenance determination. For example, a web browser may display an indication as part of the interface related to the provenance (e.g., a green check displayed if known, red X if unknown, a seal of certification, etc.). In still further examples, ancillary data for the media content or media file, if present, may also be provided at operation 510.

Returning to operation 508, if the media file was not previously analyzed by the provenance service then flow branches NO to operation 512 and the media is sent to the provenance service for analysis. Sending the media to the provenance service may include sending the entire media file or, in some circumstances, a portion of the media file to the provenance service. In response to sending the media file, flow continues to operation 514 where the results of the analysis are received and then returns to operation 510 where the results of the provenance determination are provided.

Figure 6:
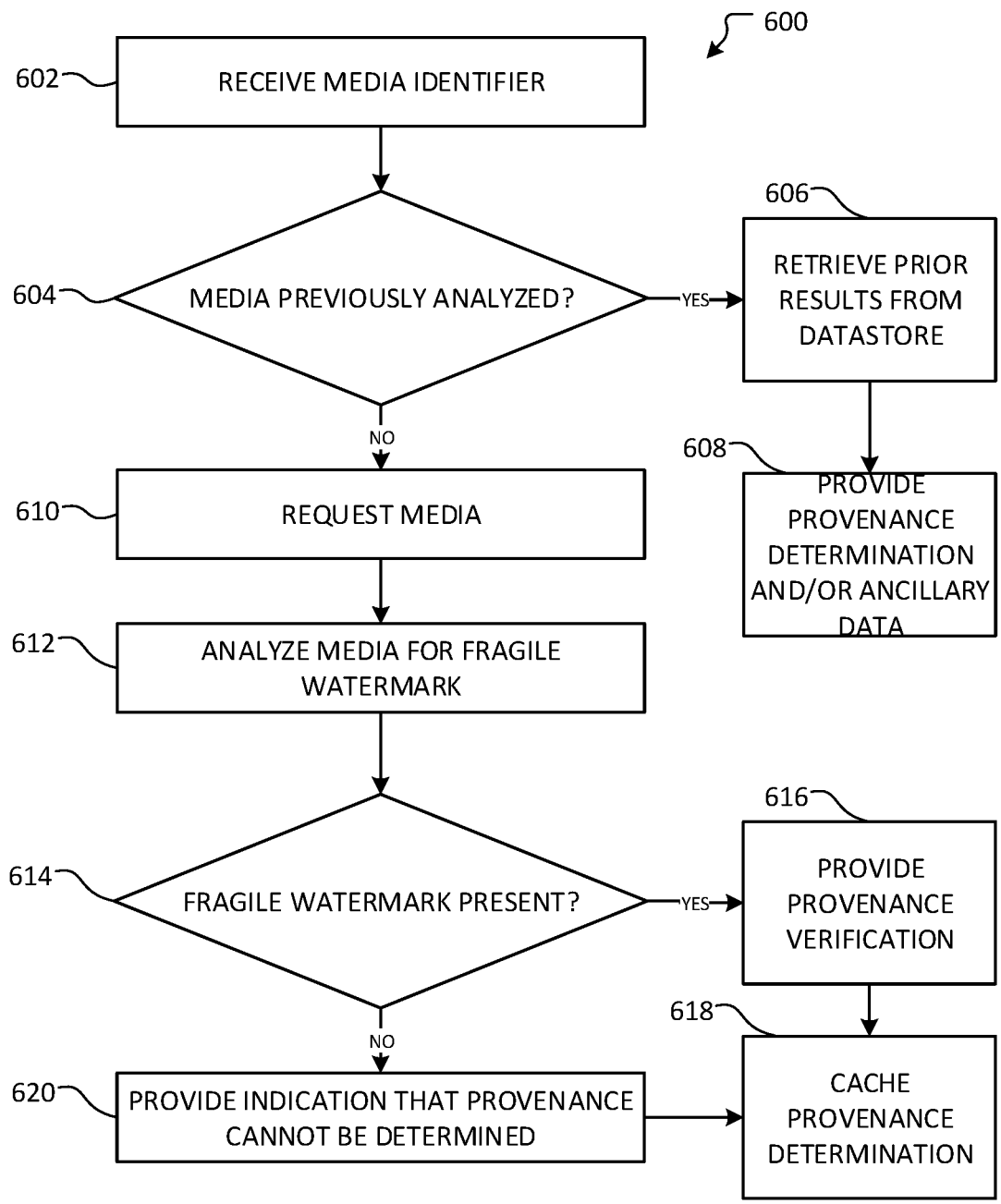
FIG. 6 is an exemplary method 600 for analyzing a media file to determine provenance of the media.

FIG. 6 is an exemplary method 600 for analyzing a media file to determine provenance of the media. In examples, the method 600 may be performed by a provenance service, such as provenance service 204. More specifically, one or more servers that are part of the provenance service may perform the method 600. Flow begins at operation 602 where a content identifier is received. In aspects, the content identifier may be a checksum, a hash, or any other type of unique identifier based upon the media content or media file to be verified. Flow continues to operation 604 where a determination is made as to whether the provenance of the media content or file identified by the content identifier was previously determined. The determination may be made using the identifier to search for prior analysis results stored in a datastore. If the media was previously analyzed, flow branches to operation 606 where results from the previous analysis are retrieved from a datastore. Retrieving the results may include retrieving a determination as to whether provenance of the media file is known or unknown. Ancillary data associated with the media may also be retrieved at operation 606. Flow continues to operation 608 where the provenance determination and, if available, ancillary data, is returned to the requesting device. The method 600 may then terminate as no further analysis is needed on the media content.

Returning to decision operation 604, if the media was not previously analyzed flow branches NO to operation 610. At operation 610, a request for the media is sent to the device that the content identifier was received from. Flow continues to operation 612 where the media is processed to determine if a fragile watermark is present in the media. In one example, one or more candidate keys are identified to determine if a fragile watermark associated with the key is present in the received media. The one or more keys may be selected based upon a purported provenance to select keys associated with the purported entity. That is, one or more key associated with the entity that is purported to have created the content may be selected. One of skill in the art will appreciate any number of processes for determining whether the media includes a fragile watermark may be employed without departing from the scope of this disclosure.

At decision operation 614, the results of operation 612 are analyzed to determine whether a fragile watermark is present in the received media. If a fragile watermark is present, then a determination is made that the received media is an accurate representation of media that was originally provided by a trusted source. Flow branches YES to operation 616 where a provenance verification is sent to a requesting device. Operation 616 may also include sending any ancillary data associated with the fragile watermark or media. Flow then continues to operation 618 where a unique identifier is created for the media. As noted above, the unique identifier may be created by applying a hash to the analyzed media content of file or by using any other type of deterministic process or function on the media to generate a unique identifier that can be replicated by other devices using the same process on the media content or file. The unique identifier is then used to store the results of the media analysis in a cache for future lookups.

Returning to operation 614, if a fragile watermark is not identified, flow branches NO to operation 620 where a message indicating that provenance of the media file cannot be determined is sent to the requesting device. Flow then returns to operation 618 where the results of the provenance determination are cached as previously described.

Figure 7:
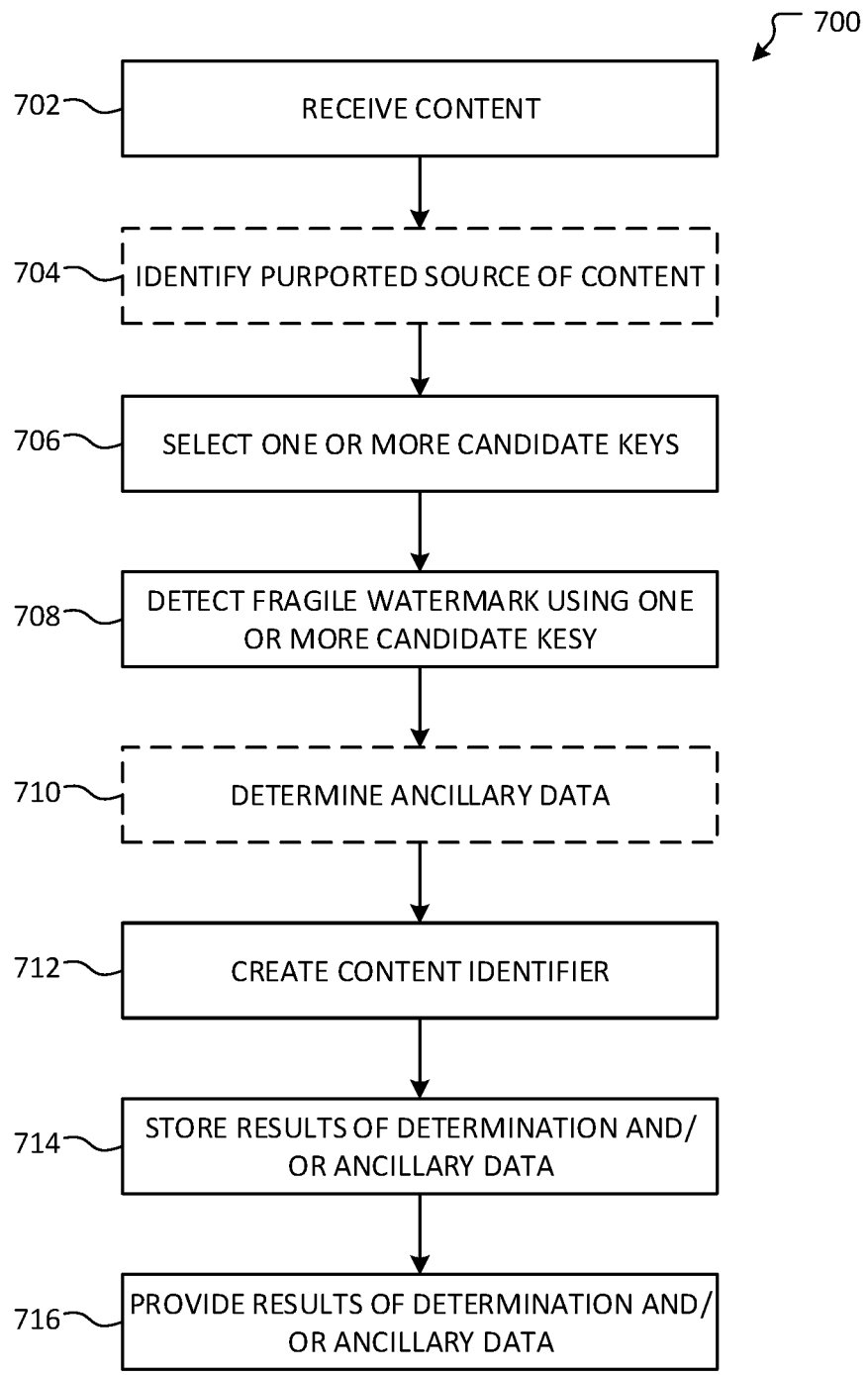
FIG. 7 is yet another exemplary method 700 for determining provenance of media content or a media file.

FIG. 7 is yet another exemplary method 700 for determining provenance of media content or a media file. The method 700 may be performed remotely by a provenance service or locally on device consuming the media content so long as the device has access to the candidate keys used to create a fragile watermark. Flow begins at operation 702 where a media content or media file is received. As previously discussed, any type of media content or file may be received at operation 702. At operation 704, a purported source of the media content or file is determined. In one example, the purported source may be determined by analyzing the media content or media file. For example, metadata associated with the media may be analyzed to determine a purported source. Alternatively, an indication of the purported source may be received with the media itself at operation 702.

At operation 706, one or more candidate keys are selected. The one or more candidate keys may be selected based upon the purported media source. As previously noted, trusted entities may be associated with one or more candidate keys. If the received media is purported to be from a specific trusted entity, one or more candidate keys associated with the purported entity may be selected at operation 706. Flow then continues to operation 708 where the one or more selected candidate keys are used to process the media content to identify a fragile watermark. As previously discussed, any type of process know to the art to create fragile watermarks for digital media may be employed with the aspects disclosed herein. Similarly, any type of process known to the art for detecting fragile watermarks may be used at operation 708. The one or more keys may be employed with the selected process in order to verify the presence of a fragile watermark. If the fragile watermark is present, the provenance of the media can be verified.

Upon verifying the provenance, flow continues to option operation 710. As previously noted, during the creation of a fragile watermark ancillary data may be associated with the fragile watermark or the media file itself. Once provenance is determined, any ancillary data associated with the fragile watermark or media file is detected or extracted at operation 710. Continuing to operation 712, a content identifier is created. The content identifier is a unique identifier that may be created by applying a hash to the analyzed media content of file or by using any other type of deterministic process or function on the media to generate a unique identifier that can be replicated by other devices using the same process on the media content or file. Upon creation of the unique identifier, flow continues to operation 714 where the results of the provenance verification are stored along with any related ancillary data. As previously discussed, associating the results of the fragile watermark detection process allows for an efficient determination of provenance when the same media is subsequently received. Instead of processing the media to identify a fragile watermark, a unique identifier for the media may be used to look up the prior processing results. Flow continues to operation 716 where the results of the provenance determination and/or any ancillary data associated with the media are returned.

Figure 8:
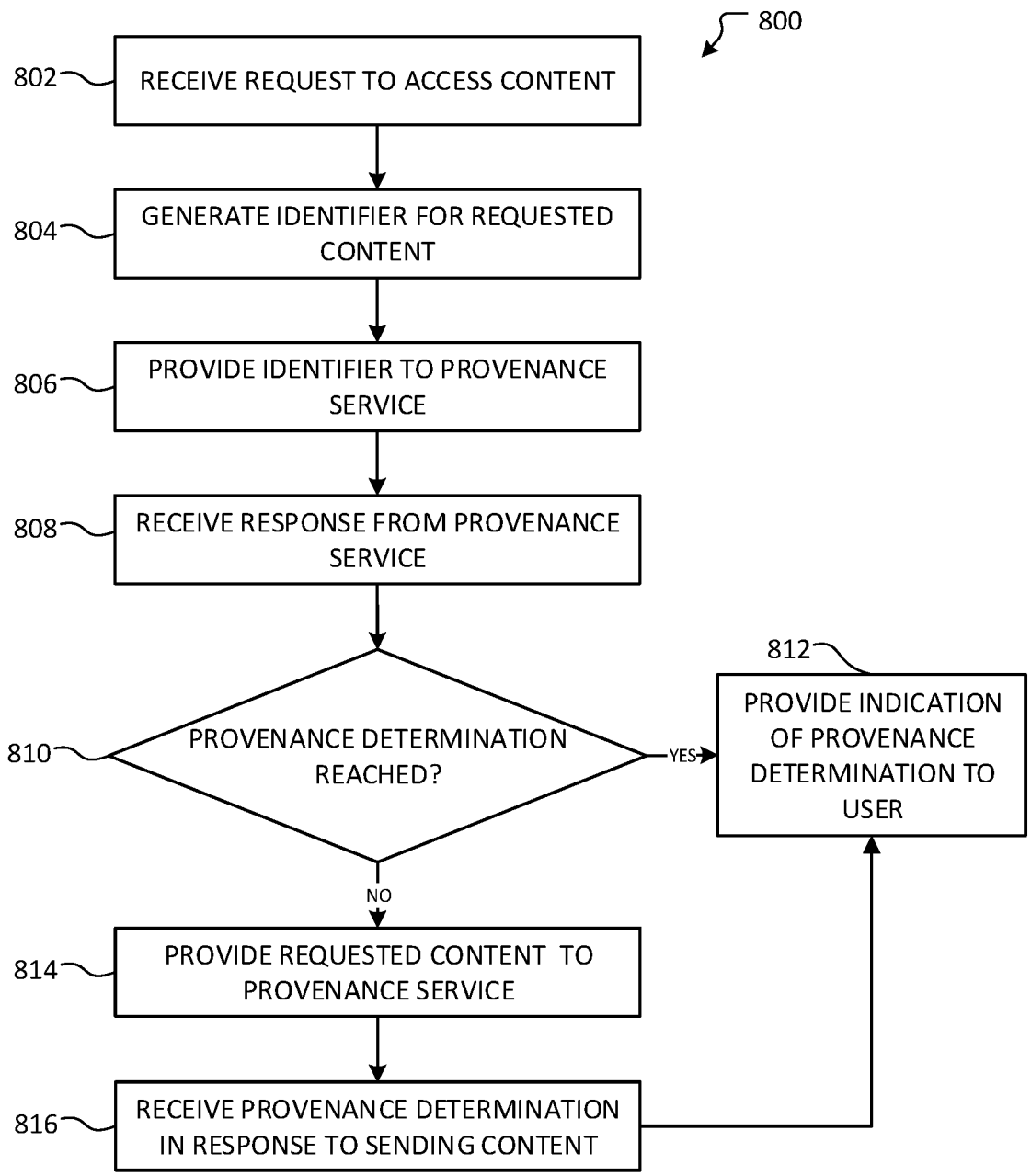
FIG. 8 is an exemplary method 800 for determining the provenance of media performed by a client device.

FIG. 8 is an exemplary method 800 for determining the provenance of media. The method 800 may be performed by a client device such as a smartphone, tablet, personal computer, television, or any other type of device capable of requesting and/or playing media content. In examples, the method 800 may be performed by a media application resident on the client device, such as a browser, a streaming media application, a media player, and the like. At operation 802, a request to access and/or present media content is received. The request may be a user request to play a media file, to navigate to media over a network, or the like. Upon accessing the media, flow continues to operation 804 where a unique identifier is generated for the requested media content or file. As previously discussed, the unique identifier may be created by applying a hash to the analyzed media content of file or by using any other type of deterministic process or function on the media to generate a unique identifier that can be replicated by other devices using the same process on the media content or file.

Flow continues to operation 806 where the unique identifier is provided to a media provenance service. In aspects, the media provenance service may be a trusted third party that manages keys used to create fragile watermarks for trusted entities. While the provenance service is generally describes as being performed by a remote third party, one of skill in the art will appreciate that the media provenance service may also reside and execute locally on the device requesting access to the content. In response to providing the unique identifier to the media provenance service, a response is received at operation 808.

At operation 810, a determination is made as to whether the provenance of the requested media content was previously determined by the provenance service. The determination is made based upon the response received from the provenance service at operation 808. If a prior provenance determination was made, flow branches yes to operation 812 where the indication of the provenance determination is provided to the user. The indication may be used to inform the use whether the requested media is a true and accurate representation of the media as provided from a trusted entity. In examples, the application playing the media on the device may provide the indication to the user. The indication may be in the form of a graphical indication associated with the content, such as a seal of authenticity, a green check mark indicating that the requested media is an accurate representation of the media as produced by a trusted entity, a red X indicating that the media is not an accurate representation of the original media or is not from a purported media source, not from a trusted source, or the like. The type of indicator may vary depending upon the type of media application playing the requested content, the type of media, or both. Alternatively, rather than providing an indication that the provenance of the media content cannot be verified, the process performing the method 800 may prevent the media content from playing on the local device.

If a provenance determination was not previously made for the requested media, flow branches NO from operation 810 to operation 814. At operation 814, the requested content is provided to a provenance service. In one example, the entire media content or file may be provided at operation 814. Alternatively, only a portion of the media file may be provided to the provenance service at operation 814. Flow then continues to operation 816 where, in response to sending the requested media content to the provenance service, a response indicating the results of the provenance determination is received. Flow then proceeds to operation 812 where the results of the provenance determination are provided to the user.

Figure 9:
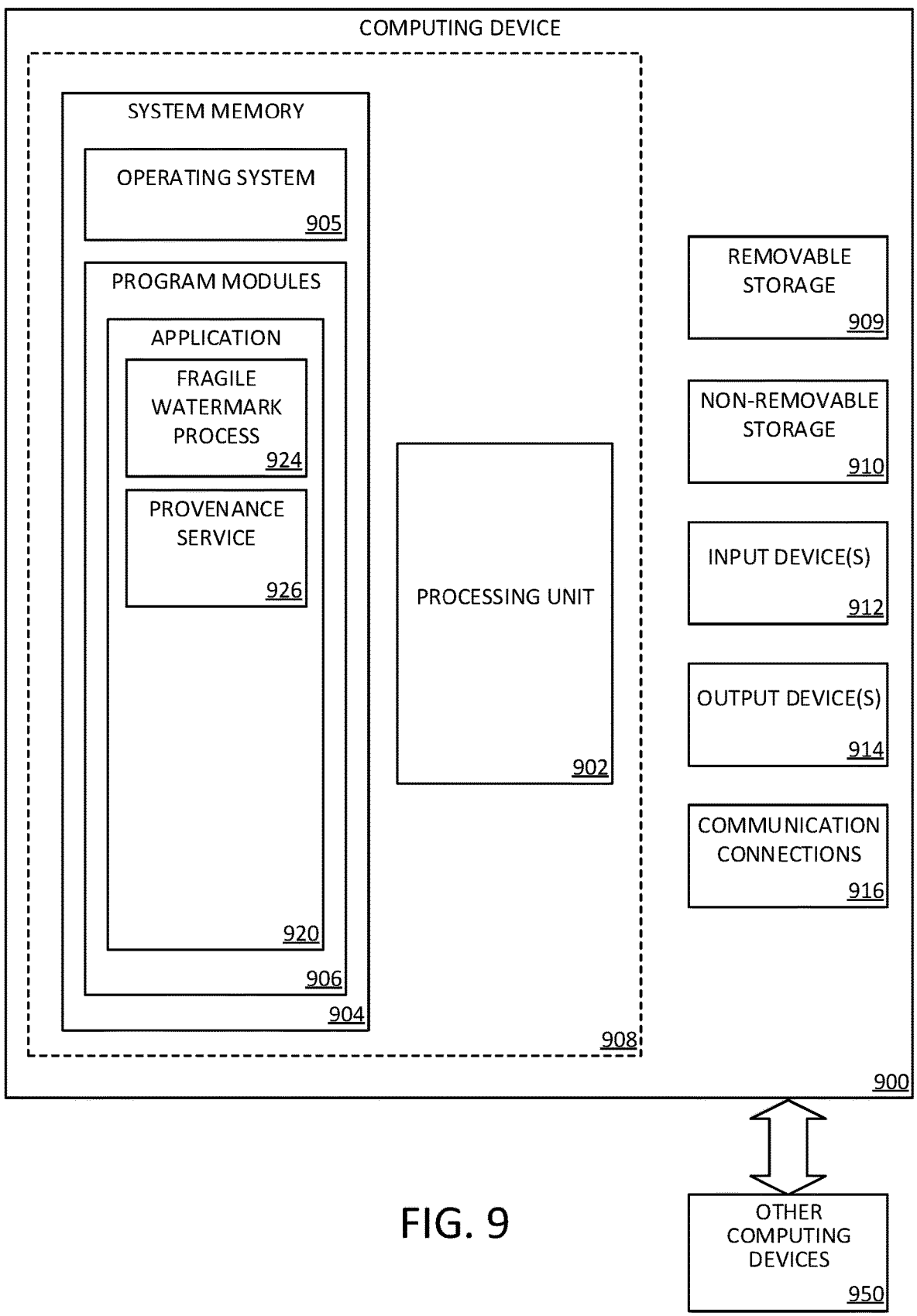
FIG. 9 is a block diagram illustrating example physical components of a computing device with which aspects of the disclosure may be practiced.

FIGS. 9-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes such as including, but not limited to, the aspects, as described herein such as fragile watermark creation or detection 924 or provenance service 926. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
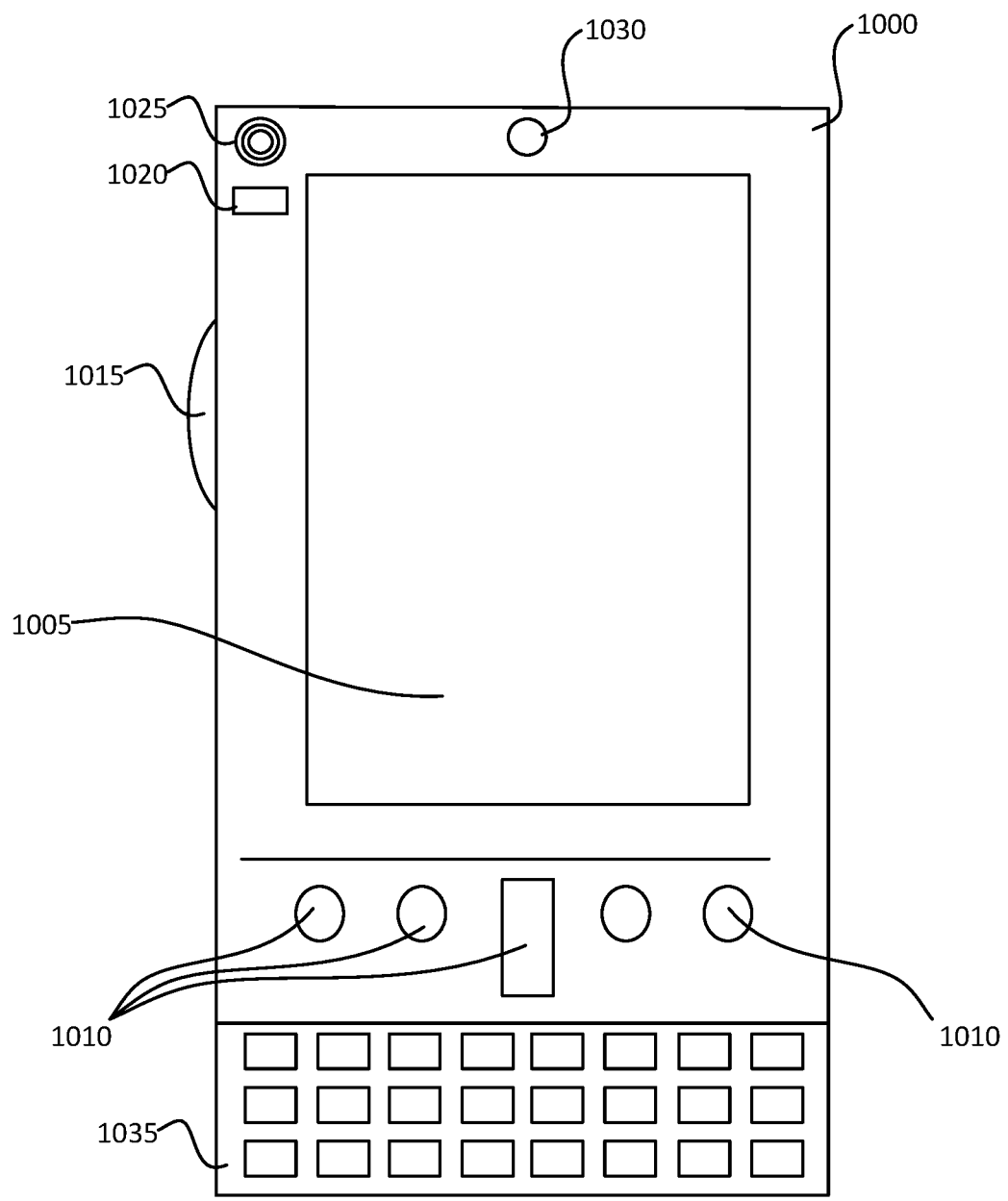
FIGS. 10A and 10B are simplified block diagrams of a mobile computing device with which aspects of the present disclosure may be practiced.
Figure 10B:
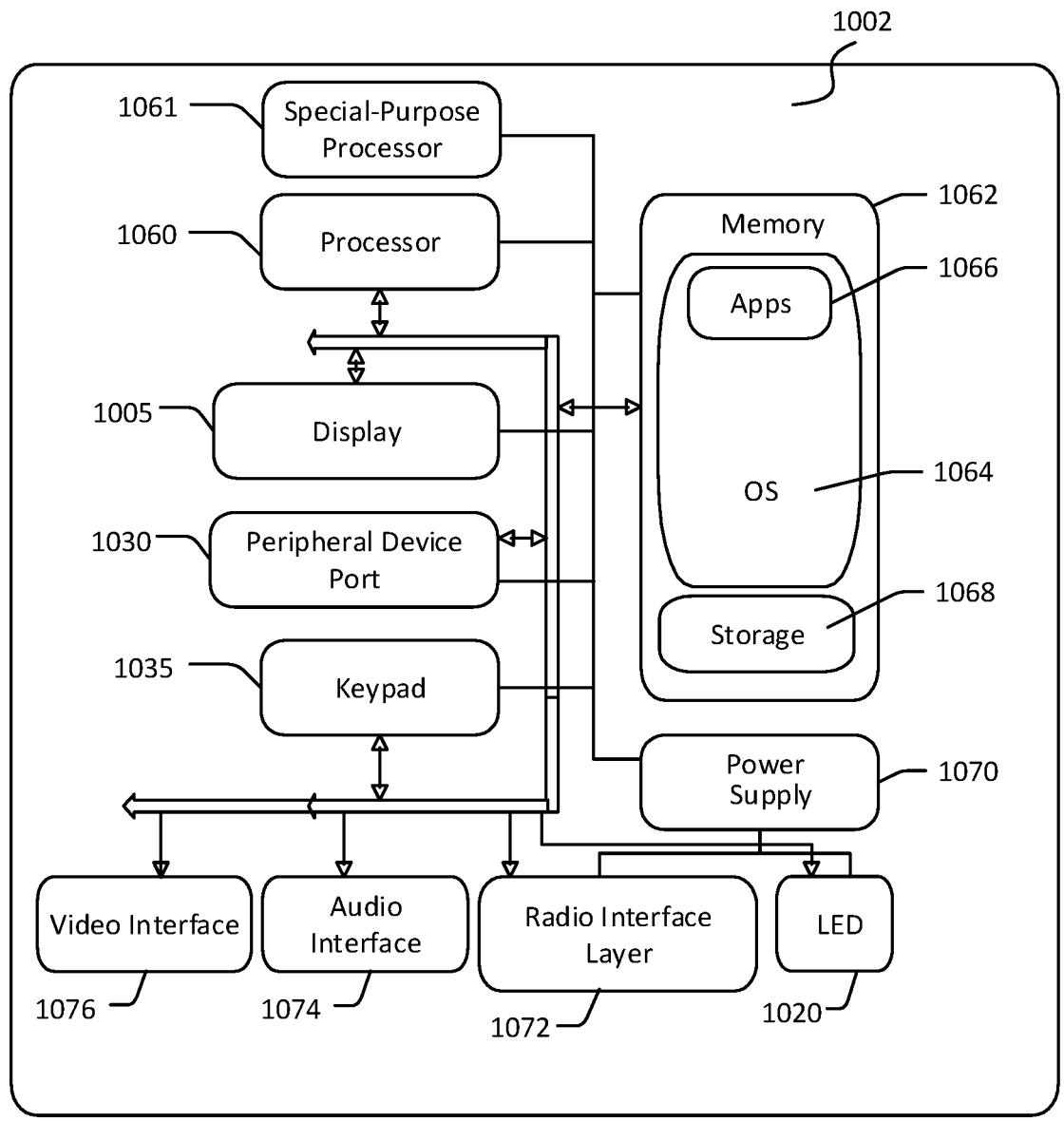

FIGS. 6A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
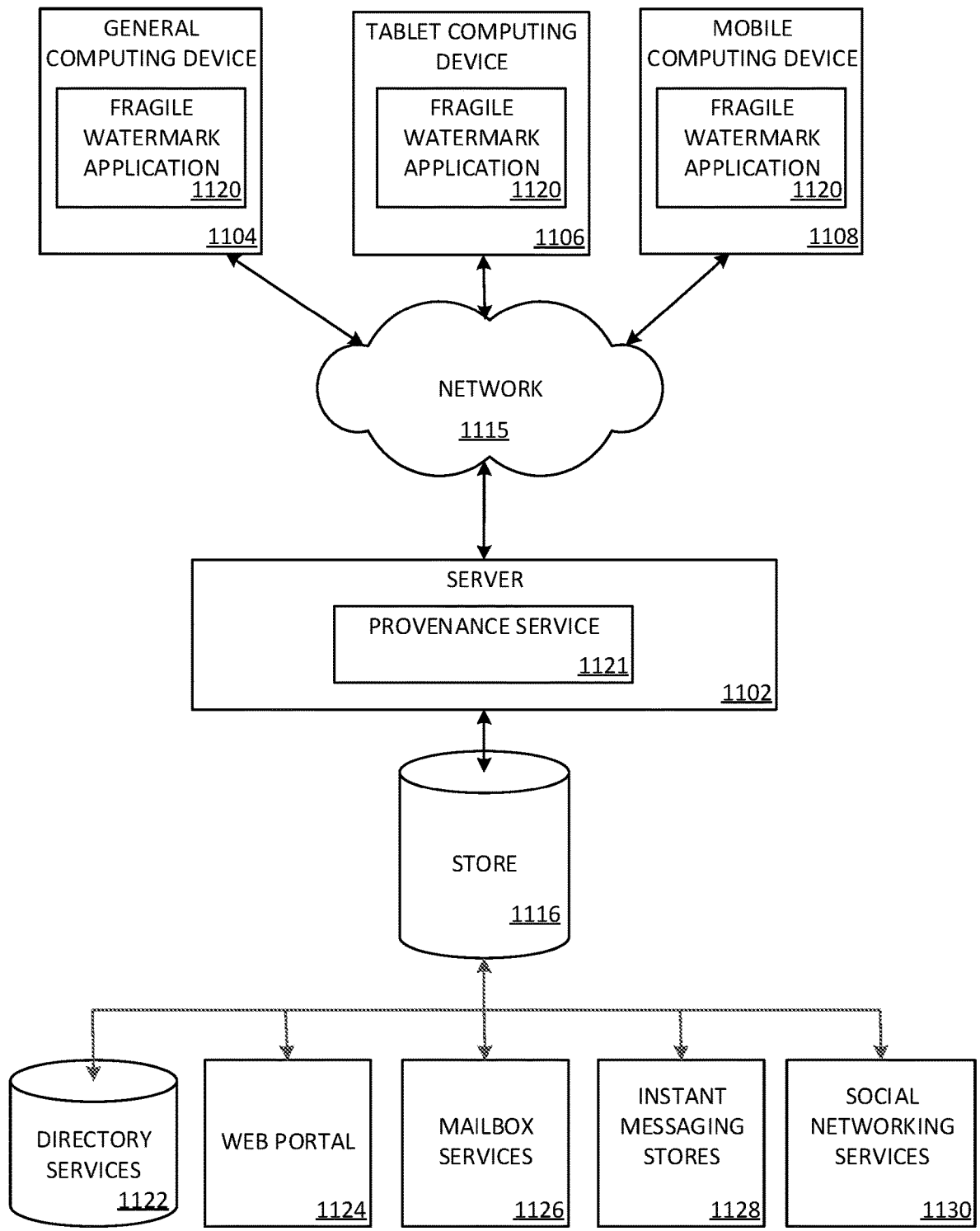
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Fragile watermark application and/or media player (not shown) may reside on personal computer 1104, tablet computing device 1106, or mobile computing device 1108. Content displayed at server device 1102 may be stored in different communication channels or other storage types. For example, various documents may be stored using a directory service 1122, a web portal 1124, a mailbox service 1126, an instant messaging store 1128, or a social networking site 1130.

Server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Provenance service 1121 may reside on server device 1102. Any of these aspects of the computing devices may obtain content from the store 1116, in addition to receiving graphical data useable to be either pre-processed at a graphic-originating system, or post-processed at a receiving computing system.

Figure 12:
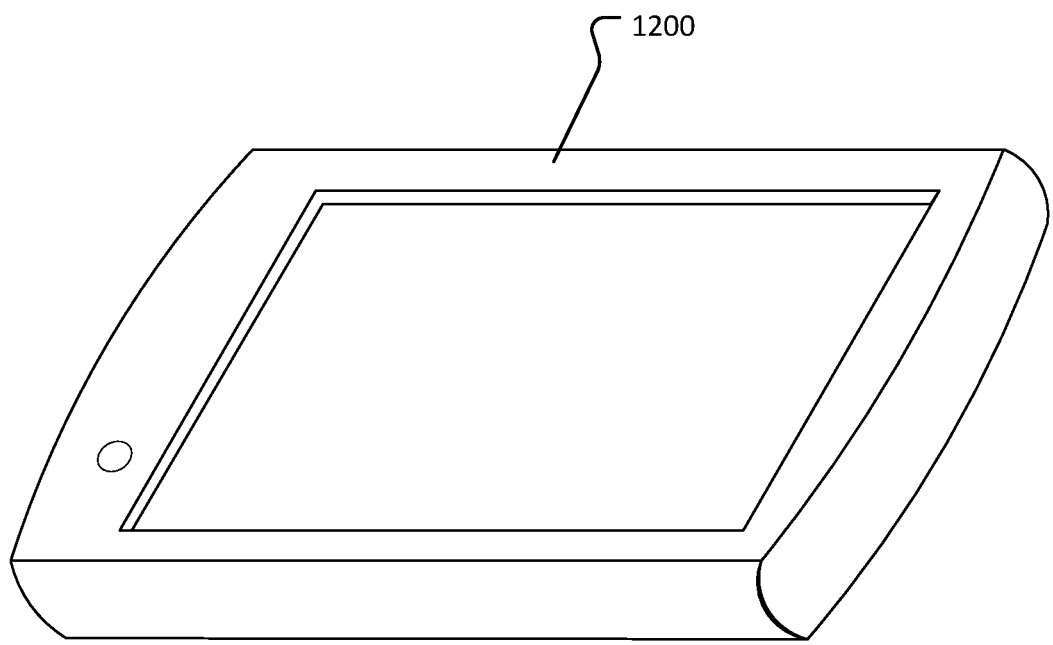
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a method for providing a fragile watermark key. The method comprises: receiving a request for a fragile watermark key, wherein the fragile watermark key is used to generate a fragile watermark on digital media content that provides an indication of provenance for the digital media content; determining an entity associated with the request for the fragile watermark key, wherein the entity is a media content producer; identifying a fragile watermark key related to the entity; and providing the fragile watermark key to a requesting device. In an example, the method further comprises receiving an entity identification with the request for the fragile watermark, wherein the entity associated with the request is determined using the entity identification. In another example, the request identifies a purported entity and the method further comprising: verifying that the purported entity; when, upon verification, the purported entity is determined to be a trusted entity, receiving an entity identifier for the trusted entity. In a further example, the fragile watermark key is identified using the entity identifier. In yet another example, the entity is one of: a trusted individual; a trusted organization; or a trusted device. In a further still example, a plurality of fragile watermarking keys are associated with the entity and the method further comprising: receiving additional information related to a specific entity producing the content; and selecting one or more fragile watermark keys from the plurality of fragile watermark keys based upon the additional information.

In another aspect, the technology relates to a method for requesting the provenance of a media content. The method comprises: receiving, at a media application, a request to access the media content; generating a content identifier for the media content; sending the content identifier to a provenance service; in response to sending the request to the provenance service, receiving a response indicating a provenance determination for the media content; and when the provenance determination indicates that the media content is from a trusted entity, providing an indication of a known provenance for the media content. In an example, the method further comprises: when the response indicates that the media content was not previously analyzed by the provenance service, sending the media content to the provenance service. In another example, sending the media content provides sending a portion of the media content to the provenance service. In a further example, the method further comprises: in response to sending the media content to the provenance service, receiving a response indicating the result of a provenance determination. In yet another example, the method further comprises: when the result of provenance of the media content is determined, providing a first indication that the media content is from a trusted source; and when the provenance of the media is not determined, providing a second indication that the media is from an untrusted source. In a further still example, the method further comprises: when the provenance of the media is not determined, preventing playback of the media content. In an example, generating the content identifier comprises processing the media content using a deterministic function to generate the content identifier. In another example, the media content comprises one of: a video file; an audio file; an image file; an electronic document; or streamed media content. In a further example, the trusted entity comprises one or more of: a trusted individual; a trusted organization; or a trusted device.

In a further aspect, the technology relates to a method for determining the provenance of media content. The method comprises: receiving a unique identifier associated with media content from a requestor; determining whether the media content was previously analyzed to determine provenance of the media content; when the media content was previously analyzed, providing results of the previous analysis to the requestor; and when the media content was not previously analyzed: sending a request for the media content to the requestor; receiving the media content; processing the media content determining whether a the media content includes a fragile watermark associated with a trusted source; when the media content includes the fragile watermark, providing a provenance verification to the requestor; and when the media content does not include the fragile watermark, providing an indication that provenance of the media file cannot be determined to the requestor. In an example, providing the provenance verification to the requestor further comprises providing ancillary data associated with the fragile watermark to the requestor. In another example, the ancillary data comprises at least one of: information about the trusted source; a device identifier for the device used to capture the media content; a globally unique identifier for the media content; or a transcript of the media content. In a further example, the method further comprises: upon completion of the processing of the media content, generating a unique identifier for the media content; and caching results of the processing using the unique identifier. In yet another example, providing the results of the previous analysis further comprises providing ancillary data previously identified as being associated with the fragile watermark.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for providing a fragile watermark key, the method comprising:
    receiving a request for a plurality of fragile watermark keys, wherein the plurality of fragile watermark keys is used to generate a fragile watermark on digital media content that provides an indication of provenance for the digital media content;
    determining an entity associated with the request for the plurality of fragile watermark keys, wherein the entity is a media content producer and has an associated entity identifier such that the associated entity identifier is provided to a provenance server;
    identifying, based on the entity identifier, a plurality of fragile watermark keys and ancillary data related to the entity; and
    providing the plurality of fragile watermark keys to a requesting device.

2. The method of claim 1, further comprising, receiving an entity identification with the request for the fragile watermark, wherein the entity associated with the request is determined using the entity identification.

3. The method of claim 1, wherein the request identifies a purported entity, the method further comprising:
    verifying the purported entity;
    when, upon verification, the purported entity is determined to be a trusted entity, and the method further comprises receiving the entity identifier for the trusted entity.

4. The method of claim 1, wherein the entity is one of:
    a trusted individual;
    a trusted organization; or
    a trusted device.

5. The method of claim 1, wherein a plurality of fragile watermarking keys is associated with the entity, the method further comprising:
    receiving additional information related to a specific entity producing the content; and
    selecting one or more fragile watermark keys from the plurality of fragile watermark keys based upon the additional information.

6. A method for requesting the provenance of a media content, the method comprising:
    receiving, at a media application, a request to access the media content;
    generating a content identifier for the media content, wherein the content identifier is a unique identifier generated based upon the media content;
    sending the content identifier to a provenance service;
    in response to sending the request to the provenance service, receiving a response indicating a provenance determination for the media content; and
    when the provenance determination indicates that the media content is from a trusted entity, providing an indication of a known provenance for the media content, wherein the trusted entity has a plurality of associated keys and
    the plurality of associated keys and ancillary data were used to generate a fragile watermark for the trusted entity.

7. The method of claim 6, further comprising when the response indicates that the media content was not previously analyzed by the provenance service, sending the media content to the provenance service.

8. The method of claim 7, wherein sending the media content provides sending a portion of the media content to the provenance service.

9. The method of claim 8, further comprising, in response to sending the media content to the provenance service, receiving a response indicating the result of a provenance determination.

10. The method of claim 9, further comprising:
    when the result of provenance of the media content is determined, providing a first indication that the media content is from a trusted source; and
    when the provenance of the media is not determined, providing a second indication that the media is from an untrusted source.

11. The method of claim 9, further comprising when the provenance of the media is not determined, preventing playback of the media content.

12. The method of claim 6, wherein generating the content identifier comprises processing the media content using a deterministic function to generate the content identifier.

13. The method of claim 6, wherein the media content comprises one of:
    a video file;
    an audio file;
    an image file;
    an electronic document; or
    streamed media content.

14. The method of claim 6, wherein the trusted entity comprises one or more of:
    a trusted individual;
    a trusted organization; or
    a trusted device.

15. A method for determining the provenance of media content, the method comprising:

receiving a unique identifier associated with media content from a requestor, wherein the unique identifier is generated based upon the media content;

determining whether the media content was previously analyzed to determine provenance of the media content;

when the media content was previously analyzed, providing results of the previous analysis to the requestor; and when the media content was not previously analyzed:

sending a request for the media content to the requestor;

receiving the media content;

processing the media content determining whether the media content includes a fragile watermark associated with a trusted source, wherein the trusted source has one or more associated keys and the one or more associated keys were used to generate a fragile watermark for the trusted entity;

when the media content includes the fragile watermark, providing a provenance verification to the requestor; and when the media content does not include the fragile watermark, providing an indication that provenance of the media content cannot be determined to the requestor.

16. The method of claim 15, wherein providing the provenance verification to the requestor further comprises providing ancillary data associated with the fragile watermark to the requestor.

17. The method of claim 16, wherein the ancillary data comprises at least one of:

information about the trusted source;

a device identifier for the device used to capture the media content;

a globally unique identifier for the media content; or a transcript of the media content.

18. The method of claim 15, further comprising:

upon completion of the processing of the media content, generating a unique identifier for the media content; and caching results of the processing using the unique identifier.

19. The method of claim 15, wherein providing the results of the previous analysis further comprises providing ancillary data previously identified as being associated with the fragile watermark.

\* \* \* \* \*